United States Patent [19]

Maget

[11] Patent Number: 5,149,413
[45] Date of Patent: Sep. 22, 1992

[54] EFFICIENT ELECTROCHEMICAL MOTOR

[76] Inventor: Henri J. R. Maget, 6455 La Jolla Blvd., La Jolla, Calif. 92037

[21] Appl. No.: 563,050

[22] Filed: Aug. 6, 1990

[51] Int. Cl.⁵ .................... C25B 9/00; B01D 13/02
[52] U.S. Cl. ..................... 204/258; 204/DIG. 6; 204/301
[58] Field of Search .......... 429/4, 8; 204/421, 301, 204/129, 252, 265, 266, 258

[56] References Cited

U.S. PATENT DOCUMENTS

| | | | |
|---|---|---|---|
| 862,867 | 8/1907 | Eggleston | 417/390 |
| 3,739,573 | 6/1973 | Giner | 60/407 |
| 4,402,817 | 9/1983 | Maget | 204/301 |
| 4,522,698 | 6/1985 | Maget | 204/301 |
| 4,648,955 | 3/1987 | Maget | 204/258 |
| 4,687,423 | 8/1987 | Maget et al. | 417/379 |
| 4,886,514 | 12/1989 | Maget | 604/891.1 |
| 4,902,278 | 2/1990 | Maget et al. | 604/132 |

*Primary Examiner*—John Niebling
*Assistant Examiner*—Kathryn Gorges
*Attorney, Agent, or Firm*—Brown, Martin, Haller & McClain

[57] ABSTRACT

An improved high-efficiency electrochemical motor is disclosed that uses hydrogen gas in a gas-tight pump housing to convert electrical energy to mechanical work. The motor consists of an electrolytic membrane with pervious electrodes on both sides separated by the thickness of the electrolytic membrane such that the gas, being electrochemically reversibly active, enters into an anodic reaction on one side of the membrane where the gas molecules are converted to ions transportable through the electrolytic membrane and a cathodic reaction at the opposite electrode where the ions are reconverted to gas molecules. By applying a reversible electric current to the electrodes to transport the ions through the electrolytic membrane, the gas is pumped reversibly from one gas-tight chamber to another. A diaphragm disposed in a gas-tight motor housing moves from one motor housing partition to the other in response to an imbalance in the pressure of the gas. A novel integral pressure sensor for sensing the pressure of the gas and an integral dumping valve for rapidly resetting the diaphragm are disclosed. A controller uses the sensed pressure in controlling the magnitude and direction of the electric current that causes the gas to flow into one or the other of two gas-tight pump chambers. Convertors are disclosed for converting the gas pressure change to mechanical motion.

8 Claims, 4 Drawing Sheets

5,149,413

EFFICIENT ELECTROCHEMICAL MOTOR

BACKGROUND OF THE INVE

1. Field of the Invention

This invention involves generally devices for converting electrical power to mechanical power and more particularly involves a motor that exploits the changes in pressure induced by the electrochemical pumping of an electrochemically active gas through an electrolytic membrane.

2. Description of the Related Art

An electrochemical cell is typically formed by positioning an electrolytic membrane between and in contact with a cathode and an anode. Such a cell can either generate electricity (chemical to electrical) or do mechanical work (electrical to mechanical). When the cell is configured as a 'fuel cell' to generate electricity, a fuel gas such as hydrogen is supplied to the anode and a gaseous oxidant such as oxygen is supplied to the cathode. When the cell is configured as a motor to produce mechanical energy, an electrical voltage is applied across the anode and cathode, and an electrochemically active gas (capable of entering into an oxidation/reduction reaction) is supplied to the anode. At the anode, the gas is ionized and the ions travel across the electrolytic membrane in response to the voltage gradient across the membrane. At the cathode, the ions are reconverted to molecules of the gas, thereby increasing the pressure on the cathode side and decreasing the pressure on the anode side of the membrane. The result is a pumping action across the membrane from anode to cathode. U.S. Pat. No. 4,402,817 issued to Henri J. R. Maget on Sept. 6, 1983 discloses such a single cell used as a prime mover.

U.S. Pat. Nos. 4,522,698 and 4,648,955 issued to Henri J. R. Maget on Jun. 11, 1985 and Mar. 10, 1987, respectively, disclose improvements in the application of an electrochemical cell for the production of mechanical energy. Practitioners in the art continue to search for more efficiency and lower cost in mechanical energy sources (motors) as well as more flexible control characteristics such as high-frequency motion modulation and positioning precision. For many applications, practitioners turn to the standard electrical motor or solenoid, both well-known in the art, but the electrochemical motor may be more useful for applications requiring low power, high precision, and small size. U.S. Pat. 4,902,278 issued to H. J. R. Maget et al. on Feb. 20, 1990 is exemplary of the special usefulness of the electrochemical motor in applications where the electrical solenoid or rotary motor cannot be used. The absence of moving parts permits an embodiment of the electrochemical motor to be implanted within the human body according to the teachings of U.S. Pat. No. 4,902,278.

Energy efficiency is an important characteristic of direct current (DC) electrical-mechanical converters. Electrochemical motors, like fuel cells, become more efficient as the applied load decreases because a fixed threshold-excitation energy is not required. Electromechanical motors become less efficient as the load decreases, but can support increased loads with small incremental increases in energy. Other advantages of the electrochemical motor include the absence of geometric interdependence of the component parts. Accordingly, the design of an electrochemical motor is amenable to unusual geometries for size and shape where the designs of conventional electromechanical motors and solenoids are limited by the necessary interaction among the moving parts. Although electrochemical motors may be readily microminiaturized for low power requirements, large mechanical loads may require the use of cell stacks, which will eventually, with increasing capacity, become more complex than an electromechanical motor of equivalent capacity.

The electrochemical motor can operate over a wide dynamic range (e.g. 250 to 1) with precision unavailable in an electromechanical motor, which tends to stall at low speeds. An electrochemical motor may be reversed instantaneously and without the inertial slippage caused by the momentum of moving parts.

Accordingly, as is known in the art, there are many requirements for the features available from a typical electrochemical motor and a need for improved electrochemical motor performance characteristics. The most important of these include high energy efficiency, control precision, capacity for rapid modulation, and integrated sensing and feedback features to permit fully automatic stored-program control.

SUMMARY OF THE INVENTION

The present invention is an improved multi-functional electrochemical motor that converts direct current (DC) electrical energy to mechanical work by means of changes in the pressure of a working gas. The primary advantage of the present invention is a novel and improved physical configuration of the key components of an electrochemical motor. Because the electrochemical components of the present invention are flexibly configured, the motor can be arranged in any necessary variation between a two-dimensional juxtaposed configuration and an integrated three-dimensional configuration. Another advantage of the present invention is that it provides an electrochemical motor having novel design improvements resulting in substantially higher efficiency than heretofore available in the art. The present invention is more efficient because of several novel improvements to the three key components of the electrochemical motor. Yet another advantage of the present invention is an improved precision of control unavailable in the art obtained by adding novel internal pressure and contact sensors and providing control means sensitive to the output of these sensors.

In the present invention, the electrochemical motor comprises three key components that can be reconfigured as necessary for multi-functional applications. These three components comprise a gas storage compartment with stored gas (hydrogen), a pump housing with an electrochemical cell, and a motor housing with a diaphragm interface between the compressed gas and the environment. These three components may be arranged in an integrated stack to permit miniaturization or they may be arranged juxtaposed to form an essentially planar motor. These components, of course, can also be arranged in many other ways suggested by these two embodiments. The size and shape of the individual components may be adjusted to enhance selected performance characteristics of the electrochemical motor.

It is an important feature of the present invention that each of these three components may be independently adjusted to provide specific motor performance characteristics. For example, in an integrated miniaturized vertical configuration, the electrochemical cell area is limited, which limits the gas transfer rate and the available work produced. Furthermore, since the gas storage compartment is also small, transfer of hydrogen gas from storage has a large effect on storage pressure, which acts to quickly decrease motor efficiency because the gas is pumped from a lower pressure source to a higher pressure work area. Reconfiguring the motor to a juxtaposed planar configuration allows the electrochemical cell area to be independently increased as much as necessary to provide the desired increase in flow rate. Motor efficiency may also be independently improved by increasing the gas storage volume as needed. Moreover, the motor chamber can be independently configured to exert a mechanical force over any desired area in response to the change in gas pressure caused by the electrical energy provided to the electrochemical cell. Many other design adjustments are possible because of the independent function of these three key components.

The present invention discloses several improvements to the energy efficiency of the electrochemical motor. These improvements include special motor housing design features and other improvements made possible by the configuration flexibility discussed above. The above three key electrochemical motor components include a gas storage compartment, a gas-tight pump housing containing an electrochemical cell, and a gas-tight motor housing containing a motor diaphragm. The motor housing comprises a diaphragm separating two motor partitions, which act as diaphragm stops for the beginning of stroke (BOS) and the end of stroke (EOS) positions of the diaphragm. The topographical shape of the diaphragm is designed to permit the diaphragm to move from BOS to EOS and back again with minimal internal spring resistance to diaphragm motion.

An important feature of the present invention for improving electrochemical motor efficiency is matching the topographical characteristics and shape of at least the first of the two motor partitions to the topographical shape of the diaphragm. This results in a zero retained volume between the diaphragm and the motor partition when the diaphragm is at the BOS position. Because the starting volume is zero, the diaphragm movement at BOS begins without delay upon any increase in gas pressure. This enhances motor chamber efficiency.

Another important feature of the present invention is the selection of a material for the electrolytic membrane having a low ionic resistance, which is a desirable property for achieving high pump chamber efficiency because it reduces $I^2R$ loss in the membrane.

To overcome the practical problems of providing low drive voltages for high-efficiency electrolytic membranes, the conventional single-electrode pair attached to the membrane should be replaced in the present invention by series-connected multiple cells. This arrangement reduces single-cell current while increasing the cell voltage. Cross-membrane series connections are achieved with contact posts located at the periphery of the membrane, which avoids dedication of membrane surface areas for interconnections. Although this improvement is not necessary for proper motor function, it avoids a mismatch between the DC power requirements of the electrochemical motor and conventional power sources such as batteries and avoids the normal requirements for battery voltage regulation or motor stacking, both of which are costly and inefficient.

The two primary energy losses in an electrochemical motor are the motor chamber expulsion energy (push stroke from BOS to EOS) and the pump chamber "dumping" energy (reset to BOS). The expulsion and dumping energy losses are affected by the motor design characteristics (diaphragm, dead space volume and stroke volume), the ratio of the external pressure to the supply pressure and the pumping rate. Normally, the electromechanical membrane voltage is merely reversed to effect a dumping of the gas from the pump chamber back into the storage compartment.

An important feature of the present invention is the addition of a separate dump valve that quickly dumps the motor chamber input pressure when supplied with a controller voltage generated in response to an EOS sense output. The dump valve energy (required to open and close the dump valve) is affected primarily by the valve design. An electrochemical dump valve quickly and efficiently returns the diaphragm from EOS to BOS position in the motor housing, as will other dump valves.

The novel improvements to electrochemical motor control disclosed in the present invention include the addition of an integrated electrochemical pressure sensor to the electrolytic membrane in the pump housing and the addition of EOS and BOS contact sensors at the motor chamber partitions. The pressure sensor provides an output voltage resulting from the pressure difference between the two pump chambers as sensed across the electrolytic membrane. The pressure sensor output voltage is monitored and used in the control of the motor. The EOS and BOS contact sensor outputs result from the contact, between the diaphragm, and the motor chamber diaphragm stops and can be used to trigger dumping and recovery signals from the motor controller. A temperature sensor such as a thermistor is also useful for motor control.

In the present invention, a microprocessor, using information provided by the pressure sensor and a thermistor located near the pump module, controls the operation of the motor by controlling the current applied to the electrolytic membrane. The motor can be operated under stored-program control to maximize electrochemical motor efficiency. Thus, the present invention provides several sensor outputs that are used by a microprocessor-based controller to optimize motor efficiency and performance. The foregoing, together with other features and advantages will become more apparent after referring to the following specification and claims in conjunction with the accompanying drawings.

BRIEF DESCRIPTION OF THE DRAWINGS

For a more complete understanding of the present invention, reference is now made to the following detailed description of preferred embodiments as illustrated in the accompanying drawings wherein:

FIG. 7, comprising

FIG. 9, comprising

DESCRIPTION OF THE PREFERRED EMBODIMENTS

Figure 1:
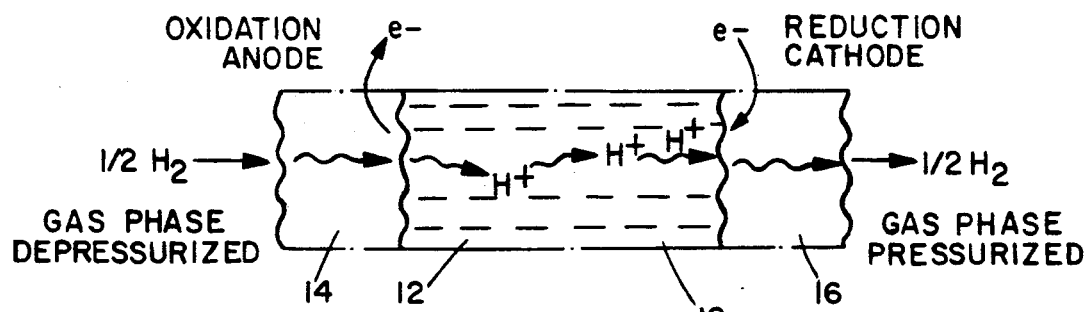
FIG. 1 shows a schematic representation of the electrochemical ionic transportation process which occurs in the electrolytic membrane.

Referring to FIG. 1, which illustrates the ionic transfer mechanism occurring across an electrolytic membrane 10, there is an ionomer 12 having two electrodes 14 and 16 in intimate electrical contact, one on each side. Electrodes 14 and 16 are pervious to hydrogen gas ($H_2$), permitting the hydrogen molecule to move from the electrode surface to the ionomer 12 surface. By applying a voltage to electrodes 14 and 16, well-known processes occur which result in the oxidation of hydrogen atoms ($\frac{1}{2} H_2$) at the surface between electrode 14 and ionomer 12 and reduction of hydrogen ions ($H^+$) at the interface between ionomer 12 and electrode 16. As part of this process, an electron is removed from electrode 14 for each such oxidation and an electron is added to electrode 16 for each such reduction. This process may be reversed merely by reversing the voltage applied to electrodes 14 and 16. The overall process results in a net flux of hydrogen from anode to cathode, thereby depleting hydrogen in the anodic chamber and increasing hydrogen in the cathodic chamber. Any change in the voltage applied between electrodes 14 and 16 will change the rate of removal and insertion of electrons ($e^-$) and thereby directly and proportionally change the rate of hydrogen movement across cell membrane 10.

The practical application of this electrochemical pumping process to the compression and decompression of stored hydrogen requires the use of a rigid by supported electrolytic separator such as cell membrane 10 in FIG. 1. Such a separator must have a high ionic conductivity, must tolerate high current densities and exhibit low hydrogen diffusion resulting from a pressure differential across the separator. Perfluorosulfonated ionomer membranes are well-suited for this purpose and are well-known in the art. For instance, refer to "Ion Exchange Membrane Fuel Cells" by H. Maget, *Handbook of Fuel Cell Technology*, C. Berger, Editor, Prentice Hall, Inc., 1968. Also, refer to LaConti, A. B. et al., "Electrode Materials and Processes for Energy Conversions," ECS Proceedings, pp. 354–374, 1977.

Because membrane 10 has a low ionic resistance, which is a desirable property for high motor efficiencies, the voltage required between electrodes 14 and 16 is low. For example, at 0.1 $A/cm^2$ for a cell resistance of 0.5 $\Omega\text{-}cm^2$, the required voltage is 50 mV. This voltage is independent of membrane area and capacity, depending only on membrane thickness and composition. To avoid the need for energy-consuming DC-voltage regulation and to avoid the expense and difficulty of stacking the electrolytic membranes, electrodes 14 and 16 are organized in the multi-junction format illustrated in FIG. 2.

Figure 2:
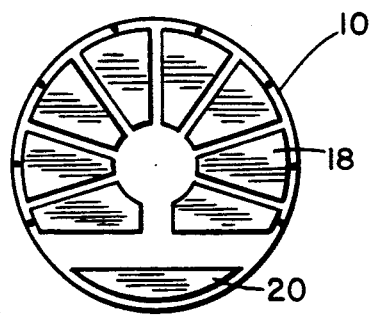
FIG. 2 illustrates a useful embodiment of the pervious electrode pattern used on both surfaces of the electrolytic membrane.
Figure 5:
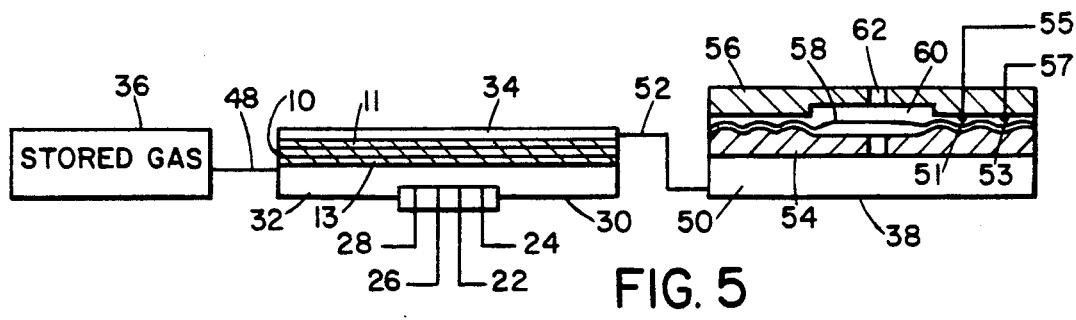
FIG. 5 shows a schematic representation of an electrochemical motor comprising the three key components in juxtaposition.

In FIG. 2, the conventional single electrode pair attached to the membrane surface is replaced by series-connected multiple cells mounted on the same membrane. Identical areas are not required, but are convenient because they would result in identical current densities for each individual electrode. The electrode surface 16 from FIG. 1 is illustrated in FIG. 2 as eight individual electrodes such as electrode 18 with substantially identical surface areas. This approach reduces the single cell current by eight times and multiplies the cell operating voltage by the same factor of eight. The number of cells and the area of each cell were selected to reduce battery current and to optimize the geometry of the electrolytic pump. Rigid support of thin electrolytic membrane 10 is achieved as shown in FIG. 5 by placing it between two identical printed circuit boards 11 and 13 designed to match the individual cell geometries. Cross-membrane series connections are achieved by means of conductive paths located at the periphery of the printed circuit boards (not shown).

Operation of the electrochemical motor requires knowledge of the relative pressures in the cathodic and anodic chambers on either side of cell membrane 10. To avoid the additional expense and complexity of adding independent pressure sensors in each chamber, an electrochemical hydrogen pressure sensor is incorporated on cell membrane 10 as electrode 20 in FIG. 2, which is electrically isolated from multi-junction electrodes 18. The electrochemical pressure sensor is a novel invention unknown in the art and is the subject of copending patent application Ser. No. 563,051 entitled "Electrochemical Force Sensor" filed concurrently herewith. Other types of pressure sensors may be used here instead of the preferred electrochemical sensor.

Figure 3:
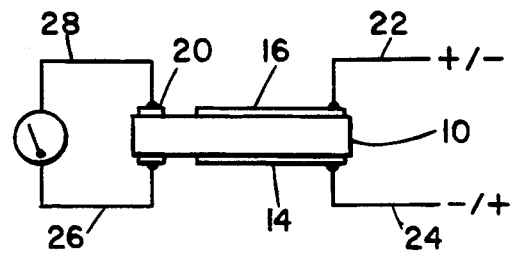
FIG. 3 illustrates the placement of an isolated pressure sensor on the electrolytic membrane surface.

The sensor voltage resulting from the pressure differential across cell membrane 10 is monitored and used to control the operation of the electrochemical motor. This concept is also illustrated in FIG. 3, where pressure sensor 20 is shown isolated from electrodes 14 and 16 on cell membrane 10. In FIG. 3, electrical conductors 22 and 24 provide electrical energy to the electrochemical cell and electrical conductors 26 and 28 access the pressure sensor output voltage. As mentioned above, an electrochemical cell acts to pump gas molecules through an ionomer cell membrane in response to applied voltage. The electrochemical hydrogen pressure sensor uses the pressure/voltage transduction phenomenon in reverse. That is, a voltage is induced across membrane 10 at electrode 20 in response to the pressure differential across membrane 10. The electrical isolation of electrode 20 prevents the sensor voltage from being masked by the drive voltage imposed on electrodes 18 by conductors 22 and 24. For hydrogen, this voltage is approximately $0.013 \ln(P_{ratio})$. Thus, for a pressure ratio ($P_{ratio}$) of 1.01, the sensor output voltage at electrodes 20 would be about 0.13 mV. The membrane and electrode materials and properties for the electrochemical hydrogen pressure sensor are identical to those properties disclosed for the electrochemical cell membrane 10 used in the present invention.

Figure 4:
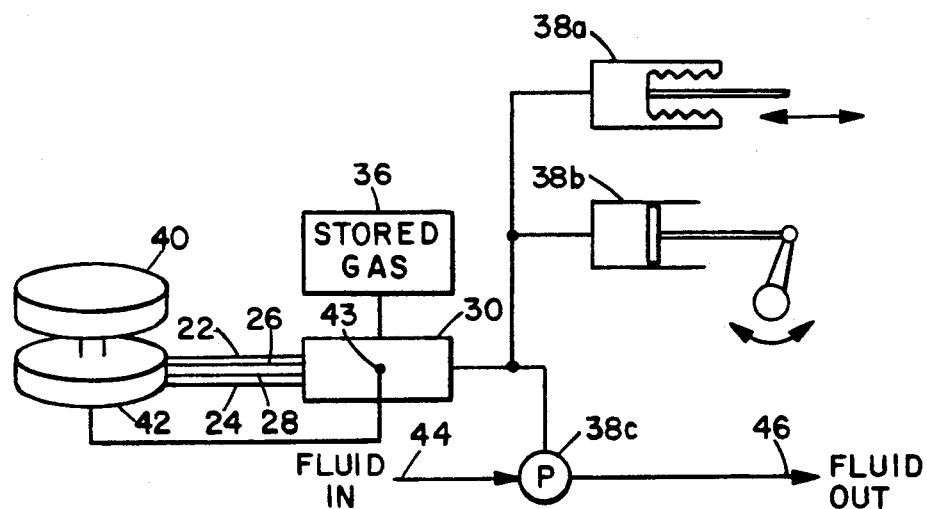
FIG. 4 provides a block diagram of the efficient electrochemical motor showing three alternate motor output schemes.

The cell membrane 10 illustrated in FIGS. 1-3 has a thickness of about 0.25 mm. The rigid cell assembly including the membrane, electrodes and printed circuit boards 11 and 13, is about 5 mm thick. Electrical conductors 22, 24, 26 and 28 are routed to external electrical terminals (not shown). The rigid cell assembly is installed in a rigid pump housing 30, as shown in FIG. 5, dividing housing 30 into two pump chambers 32 and 34. The gas storage housing 36 and the motor housing 38 are the other two key components of the electrochemical motor. These three key motor components are schematically illustrated in FIG. 4 together with the power supply 40 and the power control electronics 42. Together, these elements compose the efficient electrochemical motor.

Figure 6:
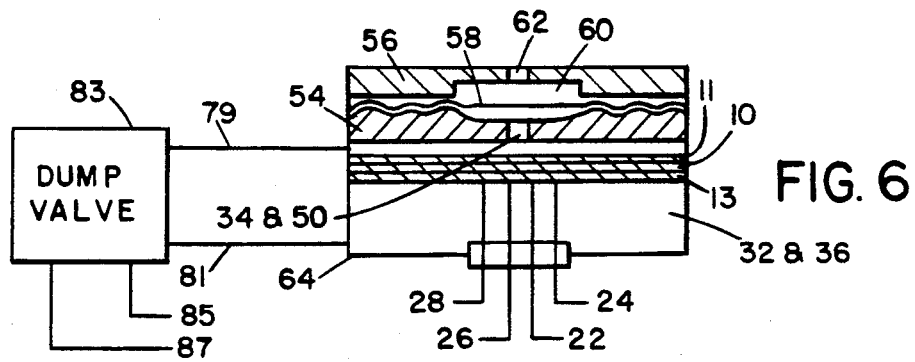
FIG. 6 shows a schematic representation of an electrochemical motor comprising the three key components in a vertically-integrated configuration.

FIG. 4 illustrates three alternate embodiments for motor housing 38. These embodiments are labeled 38a, 38b and 38c. Motor housing 38a converts the pressure output from pump housing 30 into linear motion by means of a bellows and shaft arrangement well-known in the mechanical arts. A similar technique that uses a diaphragm but no shaft is the preferred embodiment that is schematically illustrated in FIGS. 5 and 6 as motor housing 38. FIG. 4 illustrates a piston and offset cam assembly 38b for converting pump housing pressure output into rotary motion. Finally, FIG. 4 illustrates a pump assembly 38c for converting pump housing 30 pressure output into energy suitable for pumping another working fluid. Assembly 38c functions to pump fluid from input 44 to output 46.

Power control electronics 42 may comprise a microprocessor that uses well-known electronic techniques to control a current driver using information provided by the available sensors such as pressure sensor 20 shown in FIG. 3. The microprocessor (not shown) may respond to temperature sensor 43 and pressure sensor 20 outputs and controls the electrical current in conductors 22 and 24 that varies the pressure output from pump housing 30. The microprocessor will determine the motion of the motor housing output means 38 and make corrective changes to the electrical driving signal to pump housing 30 as necessary to control motor output. Secondary microprocessor functions include calibration, diagnostic tests, and record-keeping.

Referring to FIG. 5, we see the three key electrochemical motor components illustrated in juxtaposition. Gas storage reservoir 36 is filled with a supply of hydrogen gas ($H_2$) and is connected to pump chamber 32 by means of a tube 48 which allows the hydrogen gas to flow freely into chamber 32. Chamber 32 may also contain some water or water vapor to ensure that the electrolyte in membrane 10 is kept saturated. Conductors 22 and 24 conduct electrical current to cell membrane 10, which then reversibly pumps hydro9en gas from pump chamber 32 to pump chamber 34. Pump chamber 34 is connected to lower motor chamber 50 by means of a tube 52 which allows the free flow of hydrogen from chamber 34 to lower motor chamber 50 in motor housing 38. In addition to lower motor chamber 50, motor housing 38 comprises a diaphragm compartment having diaphragm stops 54 and 56 together with a diaphragm 58.

An important design feature of the present invention is illustrated in FIG. 5 where the topographical characteristics of diaphragm 58 are identical with diaphragm stop 54 (and perhaps also diaphragm stop 56). Diaphragm stops 54 and 56 both have central orifices allowing the free passage of gas or fluid.

It will be understood that either diaphragm stop 54 or 56 can be fitted with two insulated electrical contacts 51 and 53, as shown in FIG. 5, such that an electrical connection is made between them when diaphragm 58 (formed of conductive material) is pressed against the stop so equipped. Electrical conductors 55 and 57 are connected to insulated contacts 51 and 53 and can be connected to a controller to signal BOS or EOS diaphragm position in a manner well-known in the art.

Diaphragm 58 is gas-tight and moves in response to changes in the hydrogen gas volume contained in motor chamber 50. Diaphragm 58 movement changes the volume (and thereby the pressure) in upper motor chamber 60. Thus, we see that electrical current applied to conductors 22 and 24 will cause motion of diaphragm 58 and a pressure increase at motor housing output 62. This process is precisely reversible.

FIG. 6 illustrates a preferred embodiment which integrates the three key electrochemical motor components in a vertical stack. In FIG. 6, the gas storage reservoir 36 is integrated with pump chamber 32 to form a single chamber having substantial volume. Pump chamber 34 is integrated with motor chamber 50 to form a single chamber having very small volume for enhanced mechanical efficiency. All other elements of the electrochemical motor embodiment in FIG. 6 perform in the manner described above in conjunction with FIG. 5.

Because the electrochemical motor efficiency is related to the dead space in lower motor chamber 50, diaphragm 58 is designed to rest against the surface of diaphragm stop 54. Both stop 54 and diaphragm 58 have identical topography to minimize retained volume at the BOS position. Similarly, an EOS stop is provided by diaphragm stop 56 to limit displacement of diaphragm 58. The linear displacement of diaphragm 58 defines the stroke volume, which commonly ranges from about 0.01 to about 1.0 cc in the preferred embodiments.

After assembly, storage chamber 36 is filled with low pressure hydrogen (about 1 atmosphere absolute) and sealed. For certain embodiments, this pressure may be above or below atmospheric pressure. Stored gas volume should be adequate to supply hydrogen for compression of diaphragm 58 to EOS position without permitting stored gas pressures to fall below 0.4 atmospheres absolute. Conductors 22, 24, 26 and 28 are wired through the pump housing casing 64. A typical integrated motor height is about 15 mm and the diameter is selected to permit energy conversion at the desired rate.

In the illustrated embodiments, two current driving modes are useful; the continuous mode and the pulsatile mode. The continuous current driving mode requires a monotonic current increase between BOS and EOS diaphragm positions to achieve a constant diaphragm displacement rate. The current function is described in equation (10) below. The pulsatile current driving mode allows variation of current amplitude, pulse width and duty cycle. The optimization of electrochemical motor efficiency requires the selection of a current driving mode most appropriate for the particular motor design as will become apparent in light of the following discussion.

Figure 7A:
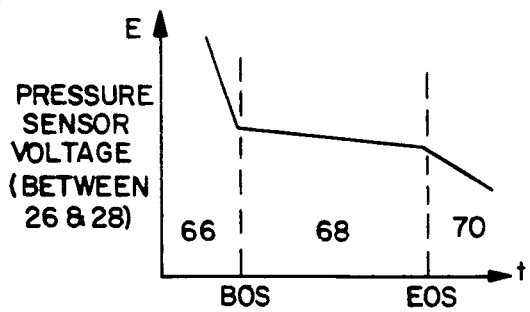
FIGS. 7A and 7B, shows the pressure sensor output voltage characteristic as a function of motor diaphragm position.
Figure 7B:
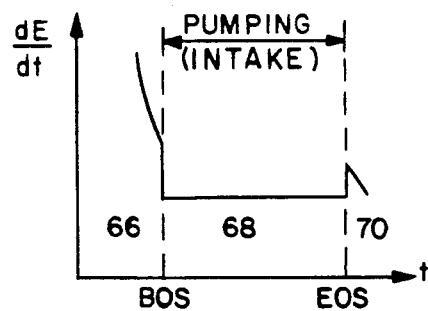

Pressure sensor 20 provides an output voltage proportional to the pressure ratio between pump chambers 32 and 34. At equilibrium, sensor 20 output voltage is zero. Sensor 20 output voltage will vary linearly with the logarithm of the ratio of the hydrogen storage pressure in chamber 36 to the pump housing output pressure in motor chamber 50 under diaphragm 58. The pressure ratio characteristic is shown in FIG. 7 as a function of diaphragm position between BOS and EOS. During the precompression step 66, the pressure under diaphragm 58 is increased to initiate diaphragm motion. Step 66 represents a constant volume, variable pressure compression. Since the dead space volume in lower motor chamber 50 is small, the rate of change of the pressure sensor output signal is high as seen in FIG. 7B. At BOS, an abrupt transition is sensed, as clearly seen in FIG. 7B. During step 68, which represents the work-producing sequence of expulsion or intake, monotonic displacement occurs and the rate of change of the pressure sensor output voltage is constant. As diaphragm 58 encounters resistance at EOS, an abrupt change again occurs in the pressure sensor output signal because the volume is constant and the pressure increases rapidly, but at a lesser rate than during step 66. This second increase in pressure is illustrated in FIG. 7 as step 70. Reversing the drive current will reverse the diaphragm motion and cause the pressure sensor output voltage signal to retrace the curve in reverse.

Figure 8:
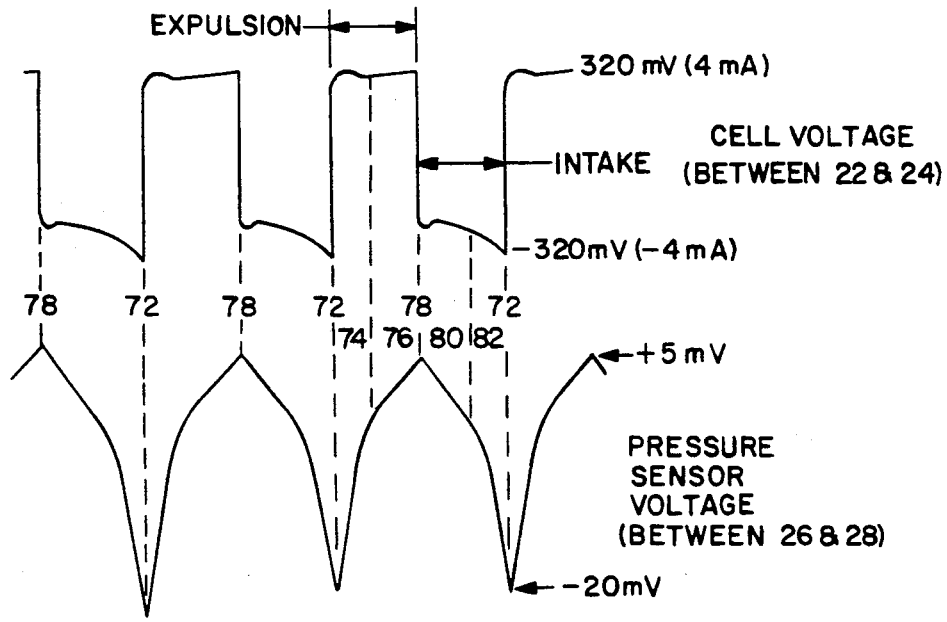
FIG. 8 shows the electrochemical motor input voltage and pressure sensor output voltage to characteristics during motor diaphragm compression (expulsion) and decompression (intake)

FIG. 8 illustrates experimental results obtained over a complete expulsion and intake cycle. A constant current of 4 ma (80 mA/cm$^2$) is applied at the beginning of the cycle when the sensor pressure output voltage of −20 mV indicates a pressure ratio $P_R = P_{diaphragm}/P_S = 0.20$ at point 72 on the diagram. Precompression step 74 is followed by expulsion step 76, which continues until EOS is achieved at 78. The current polarity is reversed at 78, resulting in fluid intake step 80 followed by decompression step 82. The rapid change in pressure sensor output voltage during decompression step 82 results from the rapid fall of hydrogen pressure in motor chamber 50 under diaphragm 58. In practical terms, the cycle is limited to the work-producing intake and expulsion phases (steps 76 and 80). Intake step 80 can be shortened by increasing the drive current amplitude to electrolytic cell membrane 10 during this step. The current profiles in FIG. 9 illustrate this possibility.

Additional reduction of intake step 82 duration is possible by incorporating a dump valve across cell membrane 10. Any dump valve well known in the art is suitable for rapidly equalizing the pressure across cell membrane 10 between chambers 32 and 34. An electrochemical dump valve comprising a simple needle valve activated with an electrochemical motor may also be used for this function. This valve is shown schematically in FIG. 6 as dump valve 83. Valve 83 is activated at EOS by a short, high current pulse through conductors 85 and 87 and dumps hydrogen from motor chamber 50 back into storage reservoir 36 through the connecting tubes 79 and 81. Following the dump current pulse, a reverse polarity pulse is provided to reset the valve. The entire dumping sequence requires less than one second. The electrochemical valve can be understood by considering linear actuator 38a in FIG. 4 as a needle valve actuator. The needle valve is well-known in the art and can be opened or closed with any linear actuator. The application of an electrochemical motor as the linear actuator for a needle valve is unknown in the art and is the subject of copending application issued U.S. pat. No. 5,038,821 entitled "Electrochemical Valve" filed concurrently herewith. Clearly, various other operating configurations are possible in light of these teachings; one of these involves double-acting systems where intake and expulsion cycles occur simultaneously.

Figure 10:
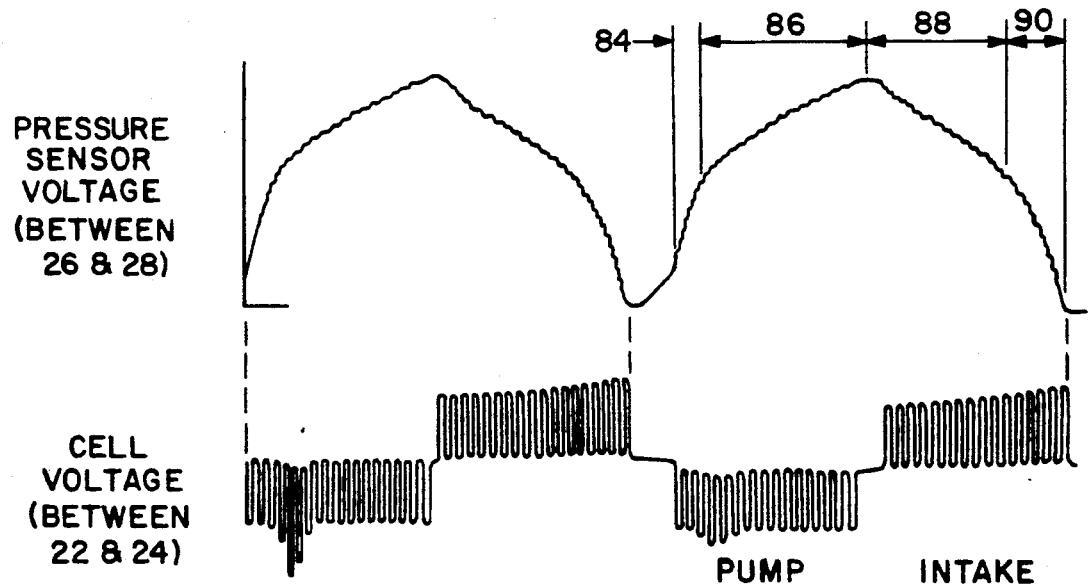
FIG. 10 shows the electrochemical motor input voltage and pressure sensor output voltage characteristics for a pulsatile operating mode.

Further reduction of controller 42 and membrane 10 power consumption can be effected by using a pulsatile drive current scheme. FIG. 10 illustrates the pressure sensor output voltage characteristic for pulsatile operating mode. The electrolytic cell voltage represents a series of 2.7 second current pulses having a 50% duty cycle. The electrochemical motor is an eight-cell (0.05 cm$^2$) motor having a ±4.0 mA current magnitude. Pulsatile control was investigated for two purposes; as a means to reduce microprocessor energy demand by allowing for dormant time periods, and to investigate electrochemical motor response to pulse currents. It is expected that pulse frequencies up to 1 kHz are possible with the illustrated embodiment. In FIG. 10, the precompression step 84 and post-compression step 90 are labeled in addition to the expulsion step 86 and intake step 88. The pressure sensor output voltage characteristic shows both the active and quiescent states of the cell current driver as a step-like ripple in the output voltage.

The design and fabrication of electrochemical motors having optimum efficiency requires an understanding of the causes of energy losses present in the illustrated embodiments. The following discussion provides the theoretical basis which is believed to underlie the improvements incorporated in the present invention. First, we consider the sources of energy losses associated with the electrochemical pumping mechanism in pump housing 30 of FIG. 5.

The energy required to generate compressed hydrogen depends on the membrane properties (ionic conductivity and gas permeability) and the electrochemical potential (over voltage and pressure differential).

The power, $P_W$ in watts, required to operate the electrochemical cell is defined as $P_W = RI^2 + EI$, where:
R is the cell resistance,
I the applied current and
E is the cell potential, excluding ohmic losses.
Since the electrode overpotentials are negligible, the power equation approximates:

$$P_W = R^*(t/A)I^2 + bI \ln P_r \quad (1)$$

where the membrane characteristics are:
R* = the linear resistance in ohm-cm;
t = the thickness in cm;
A = the cross-sectional area in cm$^2$;
b = RT/nF
where
F = Faraday Constant
R = Gas Constant
T = Temperature (°K.)
n = Number of Electrons Involved in Redox Reaction (2 for H$_2$).

The pressure ratio $P_R = P_{50}/P_{36} = P/P_S$ represents the ratio between the gas pressure P in lower motor chamber 50 under the bellows and the gas pressure $P_S$ in storage compartment 36.

The rate of gas generation, $R_g$ in cm$^3$/sec, is:

$$R_g = (aI/P) - (Pe^*/P)(P - P_S)(A/T) \quad (2)$$

where:
Pe* = the specific hydrogen permeability through the membrane in cm$^3$-cm/cm$^2$-sec, and a = A membrane constant in cm³-atm/amp-sec.

The specific energy consumption, in watt-sec/cm³, becomes:

$$E_s = (P_w/R_g) = \frac{PtI[R^*t\bar{I} + b\ln P_R]}{aIt - Pe^*(P - P_s)} \quad (3)$$

Where: $\bar{I} = I/A$ = membrane current density (A/cm²)
Equation 3 suggests that a minimum energy consumption exists where $(dE_S/dt) = 0$. The optimum membrane thickness compatible with that condition is equal to:

$$t_{opt} = [Pe^*(P-P_S)(b \ln P_R)/aR^*(\bar{I})^2]^{\frac{1}{2}} \quad (4)$$

For operation near atmospheric pressure at low pressure ratios ($P_R \approx 1$), the optimum thickness for a Nafion® 117 film becomes equal to $[10^{-4} (P_R - \bar{I}/1)]$. This gives practical film thickness values at current densities below 1 mA cm².

For most practical cases, $a\bar{I}t \gg Pe^*(P-P_S)$ and equation (3) reduces to:

$$E_S \approx E_s^* = 278[(b/a)P \ln P_R + (R^*/a)\overline{PIt}] \quad (5)$$

where $E_S^*$ is expressed in mwhr/liter of compressed gas. Further simplification is possible when the motor operates at low pressure ratios such that $P_R \approx 1$. Then:

$$E_s^* \approx E_s^{**} = 278 (R_S/a)\overline{PI} \quad (6)$$

where $R_S = R^*/t$ = specific membrane resistance in ohm-cm².

The energy required for returning the compressed gas to its original condition depends on the intake mode selected; whether constant current, time-dependent current, etc. For a constant current intake mode satisfying the condition $a\bar{I}_i R_i > Pe^*(P-P_S)$, the energy required becomes:

$$E_S^j \approx (P/a)[R_S\bar{I}_i - i \ln P_R] \quad (7)$$

where
- $T_i$ = intake cycle duration in sec,
- $\bar{I}_i = (M^*/aAT_i)$ = the intake cycle current density in A/cm², and
- $M^*/a = (P_fV_f - P_iV_i)/a$ = the coulombic charge required to transfer compressed hydrogen from the EOS position to the BOS position (See Equation (16)), and
- $P_f$ = pressure at EOS
- $V_f$ = volume at EOS
- $P_i$ = pressure at BOS
- $V_i$ = volume at BOS The energy consumption for intake, in mwhr/liter, becomes:

$$E^*{}_S^j \approx 278 (P/a) [(R_S/a)(M^*/AT_i) - b \ln P_R] \quad (8)$$

The total energy required for a complete cycle for low pressure ratios ($P_R \approx 1$) can then be represented by:

$$E_T \approx 278 (R_S/a)\overline{PI} + (M^*/aaT_i)] \quad (9)$$

This implies that, for operating conditions defined by $M^*/a$, the energy required for a complete cycle depends on the compression current density $\bar{I}$, the decompression duration $T_i$ the transfer area A. The motivation for several electrochemical motor improvements is provided by these theoretical relationships, as discussed below.

We next consider the causes of energy losses associated with the mechanical motor assembly in motor housing 38 of FIG. 5. To achieve a constant linear displacement of a diaphragm or bellows (constant fluid delivery rate), the current applied to the electrochemical cell must increase with time $\theta$ according to:

$$I(\theta) = I_o(1 + 2 L^* R_f \theta) \quad (10)$$

where:
- $L^* = [K/(P^* + KV^*)]$ defines the initial equilibrium conditions of the mechanical work-producing component,
- $P^*$ = the pressure in nt/cm²,
- $V^*$ = volume in cm³ of the gas under the diaphragm or bellows,
- $K = k/S^2$ = a diaphragm or bellows characteristic in (nt/cm⁵),
- $k$ = the diaphragm or bellows spring constant in (nt/cm),
- $S$ = the diaphragm or bellows cross-sectional areas (cm²), and
- $R_f$ = the fluid flow rate (ml/sec) resulting from the diaphragm or bellows displacement.

The initial current, $I_o$, in amps, required to start the diaphragm or bellows displacement is equal to:

$$I_o = (R_f/a)[P^* + KV^*] = /R_fk/aL^* \quad (11)$$

For a complete compression cycle, resulting in a stroke volume of $S_v$, the current at the EOS becomes:

$$I_f = I_o(I + 2L^*S_v) \quad (12)$$

The ratio between the average current and the initiation current, $$I_{ave}/I_o = (1 + L^*S_v) \quad (13)$$

represents the average value of the mechanical inefficiencies resulting from the resistance offered by the bellows or diaphragm.

Since the pressure P, the pressure ratio $P_R$ and the applied current I are time-dependent, equation (3) should be integrated over time so that:

$$E_s = (1/T) \int_O^T E_s(\theta) d\theta \quad (14)$$

over the compression cycle, (for stroke volume $S_v$ and cycle duration T seconds). In Table I below, the specific energy values assume averages of these time-dependent variables.

During the decompression cycle, the coulombic charge required to return the gas to its original condition is given $$d(PV)/d\theta = aI_i(\theta) \quad (15)$$

If decompression is conducted at an intake rate identical to the original pumping rate, the current function is time-dependent and symmetrical with the compression current of equation (10). Other intake functions such as an arbitrary current-time function, a constant current or a dump valve which will instantaneously dump the compressed gas to storage can be considered. FIG. 9 illustrates the use of a constant intake current and a dump valve.

To find the coulombic charge required to transfer compressed hydrogen from the EOS position to the BOS condition, we note that:

$$aI_iT_i = P_fV_f - P_iV_i = S_v[P^* + K(V^* + S_v)] = M^* \quad (16)$$

and therefore, intake current $I_i$ and time $T_i$ can be selected to satisfy the condition $(IT)_i = (M^*/a)$ in coulombs.

Figure 9A:
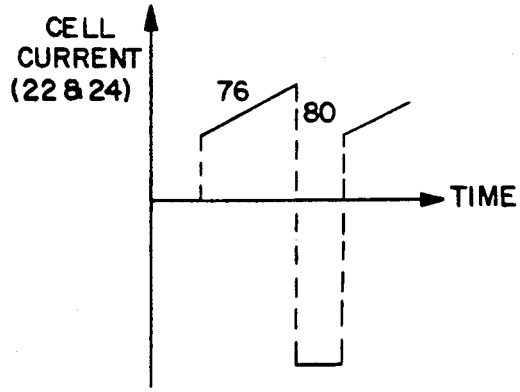
FIGS. 9A, 9B and 9C, shows the motor input current, dump valve current, and motor diaphragm pressure characteristics for a continuous operating mode.

Table I summarizes values of energy consumption, attributed to several causes, for a cycle involving a constant delivery rate (compression at a variable current) and a variable intake rate (decompression at a constant current) as illustrated in the current diagram shown in FIG. 9A.

TABLE I

Electrochemical Motor Energy Consumption (mwhr/liter)

| Source of Energy Consumption | Membrane thickness, mils | | |
|---|---|---|---|
| | Optimum[a] | 2 mils | 7 mils |
| Membrane Resistance | 0.5 | 33.0 | 116.8 |
| Overvoltage | 12.6 | 12.6 | 12.6 |
| Mechanical[b] | — | 5.5 | 19.5 |
| Total Compression Cycle[c] | 13.1 | 51.1 | 148.9 |
| Decompression Cycle[d] | 1.2 | 24.7 | 117.9 |
| Total | 14.3 | 75.8 | 266.8 |

NOTES:
[a] The optimum membrane thickness is derived from equation (3) by assuming the condition defined for equation (4). For current densities above 0.1 A/cm$^2$, the optimum thickness is less than the thickness of existing practical ionomer films. For low current densities it is within the 1-10 mil thickness range of practical films.
[b] Determined from the effect of current increases required to overcome bellows or diaphragm resistance.
[c] The operating conditions of the electrochemical motor are selected as follows: gas storage pressure $P_s$ = 1.0 kg/cm$^2$; initiation pressure $P^*$ = 1.1 kg/cm$^2$; bellows or diaphragm constant K = 0.2 kg/cm$^5$ (cross-section S = 1 cm$^2$); membrane electrode area A = 5 cm$^2$; initial volume under the bellows or diaphragm $V^*$ = 0.5 cm$^3$; stroke volume $S_v$ = 1 cm$^3$; membrane linear resistance $R^*$ = 25 ohm-cm (equivalent to 0.12 ohm-cm$^2$ for a 2 mil film and 0.44 ohm-cm$^2$ for a 7 mil film).
[d] The decompression cycle energy requirements depend on the intake mode (variable current, constant current, etc.). For this example, intake duration was selected to be substantially equivalent to the compression duration.

Figure 9B:
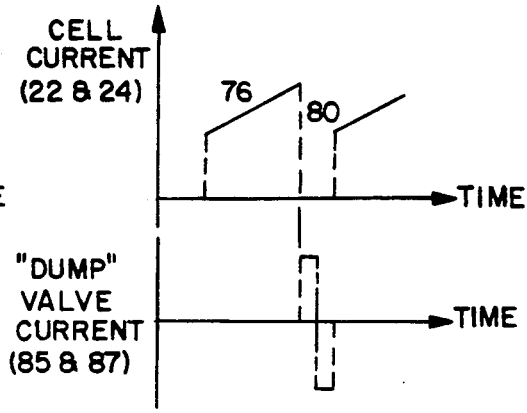

FIG. 9B illustrates the cell current characteristic resulting when a dump valve is provided to reduce the duration of intake cycle 80. The overall motor efficiency, as seen above, depends on diaphragm resistance, delivery pressure, and the dead space under a diaphragm at BOS position. For high operating pressures, system efficiency is also affected by diffusion, which acts to decrease current efficiency.

Figure 9C:
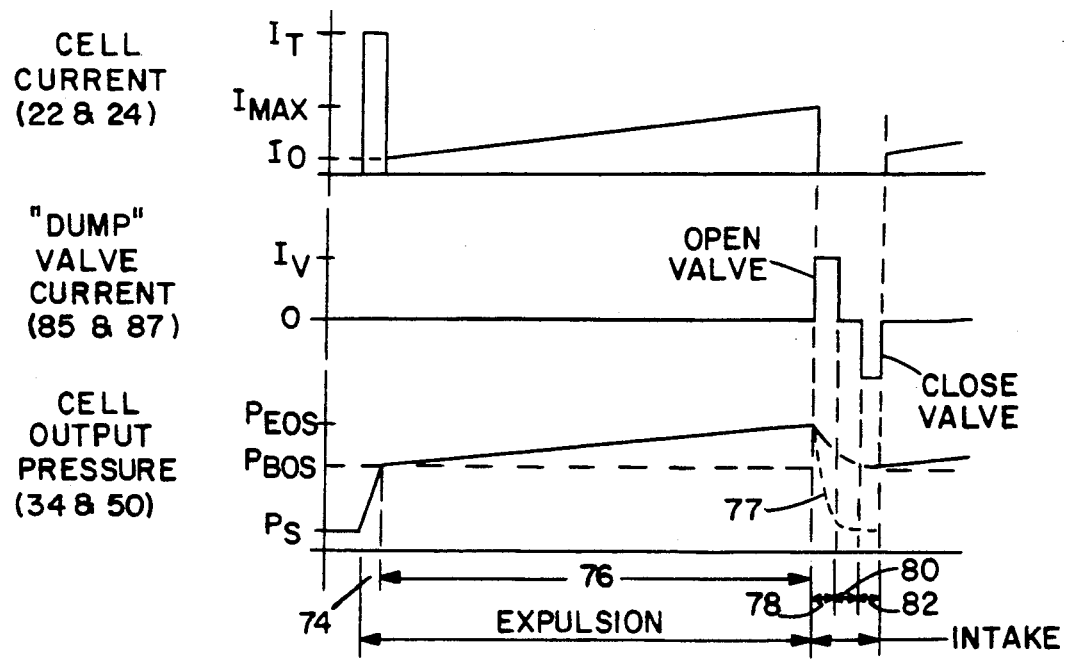

FIG. 9C illustrates the single cycle discussed for FIG. 8 in schematic form and includes electrolytic cell 10 drive current, the dump valve drive current, and the cell output pressure in motor chamber 50 under diaphragm 58. Referring to FIG. 9C, the initial cell current pulse 74 raises the pump chamber (34 and 50) pressure just enough to start diaphragm motion (precompression step). The cell output pressure rises quickly from equilibrium to $P_{BOS}$ which is the value required to initiate diaphragm motion. The cell current ramp 76 provides a constant rate of diaphragm displacement (expulsion step). Cell output pressure also rises in a linear ramp during step 76. The dump valve current pulse 78 opens the electrochemical dump valve, and cell output pressure drops from $P_{EOS}$ toward $P_{BOS}$. After the first cycle, cell output pressure will fall back to $P_{BOS}$ during steps 78 (open valve), 80 (dump), and 82 (close valve). The second cycle begins with an existing $P_{BOS}$ value in motor chamber 50, so cell current pulse 74 is not required to initiate diaphragm motion. This feature is controlled by the microprocessor-based controller (not shown). The controller adjusts the timing of interval 80 (open dump valve) to prevent cell output pressure collapse from progressing below $P_{BOS}$. Pressure sensor data available to the controller allows this adjustment using well-known techniques. If the motor cycle is halted, the cell output pressure can be dumped down to the storage reservoir equilibrium value $P_S$, as illustrated in FIG. 9C by the dotted line 77 over steps 78-82 (step 80 is not to scale and would be elongated over that shown for dotted line 77).

As readily seen from Table I, because hydrogen electrodes are quasi-reversible, the main cause of energy loss in the electrochemical motor is the electrolyte membrane resistance. For low pumping pressures, the power consumption of the electrochemical cell is primarily dependent on I$^2$R losses, whereas the gas displacement rate is proportional to current I. Therefore, the specific energy requirement in watt-hours/liter is proportional to RI. Reducing this quantity will increase efficiency. Thus, the electrochemical motor becomes more efficient with load-related decreases in cell membrane 10 current and with area-related decreases in cell membrane 10 current density.

Table I also shows that overall motor efficiency is reduced by the mechanical resistance offered by the diaphragm, the delivery pressure and the dead space under the diaphragm at BOS position. The present invention improves motor efficiency by reducing the mechanical losses associated with diaphragm resistance and the motor chamber volume established by the EOS and BOS diaphragm positions. Actual measurements of an eight-cell 1.6 cm$^2$ electrode-area electrochemical motor module designed for a maximum delivery rate of 500 ml/hr, incorporating an electrochemical dump valve and pumping water at a delivery pressure of 1.04 atmospheres, showed that the energy consumption varied from zero to 100 mwh/liter at flow rates between zero and 500 ml/hr. This compares with a commercially available DC motor-driven peristaltic pump which exhibited measured energy consumption varying from more than 1000 mwhr/liter at substantially zero delivery to a steady 600 mwhr/liter energy consumption for all delivery rates above approximately 100 ml/hr. It can be readily seen that the illustrated embodiment of the present invention offers several orders of magnitude of energy efficiency improvement over conventional DC rotary motors for low mechanical power applications. The significant differences in energy consumption characteristics between the two motors are: (a) the electrochemical pump efficiency increases with decreases in load, while DC-driven pumps become inefficient with decreasing load, and (b) DC-driven pumps can support increased loads with little additional energy demand, while electrochemical pumps are sensitive to increased loads.

The efficient electrochemical motor characteristics of major importance can be summarized as follows. The conversion efficiency of DC energy to mechanical work is higher than available from conventional electromechanical motors and improves with decreasing loads. Since all components are functionally independent, the design of electrochemical motors is amenable to unusual geometries such as two dimensional or non-cylindrical shapes and configurations. Since the diaphragm motion can be modulated through polarity reversal of the cell current or by means of other time-dependent current modulations at high frequencies, the electrochemical motor can be precisely controlled for accurate diaphragm placement. The preferred electrochemical pressure sensor functions as an absolute ratio pressure sensor. Thus, the controller can operate to adjust the cell driver current to compensate for external (atmospheric) pressure variations. The compact size and low weight favor applications requiring extreme miniaturization. The lack of moving or rotating parts (except for diaphragm flexure) provides much higher reliability than available from other motor types.

The electrochemical motor is limited in two respects. First, because electrolytic cell stacking is difficult and costly, the electrochemical motor is probably limited to applications requiring small sizes. Second, the maximum suggested pressure differential across the preferred electrolytic membrane is about 20 atmospheres, which may represent an upper mechanical performance limit for a given motor size.

Figure 11:
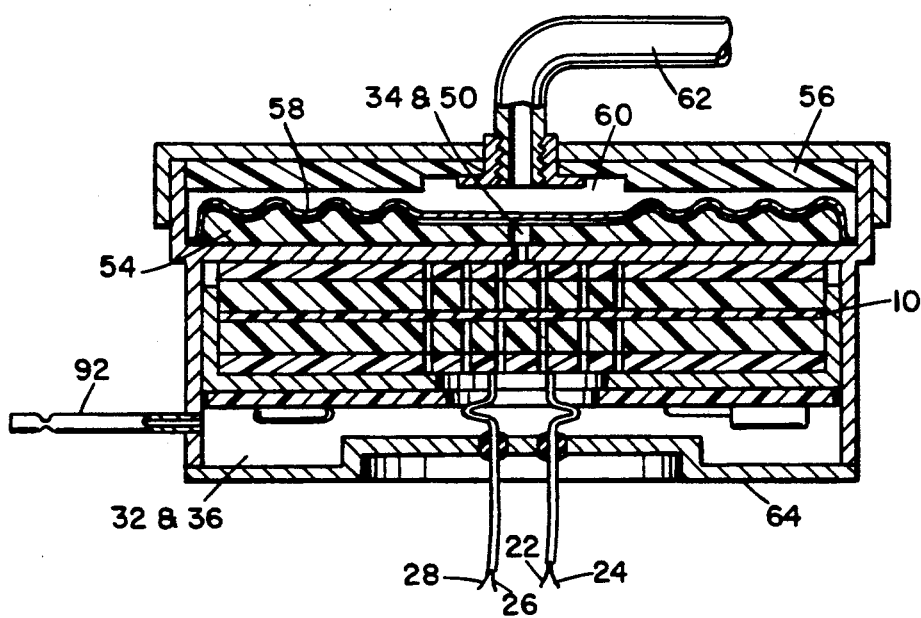
FIG. 11 shows a detailed cross-sectional drawing of a preferred vertically-integrated embodiment of an electrochemical hydrogen motor.

FIG. 11 illustrates the cross-sectional diagram of an efficient electrochemical hydrogen motor constructed and tested by the inventor. The motor is about 15 mm high and 35 mm in diameter and it is designed for pumping hydrogen at a rate of 0–75 ml/hr. A refill tube 92 is provided to allow refilling of storage chamber 36. The various other parts of the electrochemical motor are labeled in FIG. 11 and may be understood by reference to the discussion of the vertically integrated electrochemical motor illustrated in FIG. 6.

Table II documents the performance of several electrochemical motor configurations. As discussed above, the expulsion energy is affected by the pump characteristics (diaphragm, dead space volume and stroke volume), the external pressure and the pumping rate. The energy required to open and close the dump valve is primarily a function of the valve design. The three types of electrochemical pumps listed in Table II were developed and tested to demonstrate the interaction of the causes of energy loss in electrochemical motors disclosed herein.

TABLE II

Electrochemical Motor Performance

| ml/hr | Number of Cells | Single Cell Area cm$^2$ | Pump Weight grams | Stroke Vol. ml | Operating Life/Type Batteries |
|---|---|---|---|---|---|
| 2 | 8 | 0.05 | 100 | 0.10 | 30 days 1 AA Battery |
| 100 | 3 | 0.50 | 250 | 0.15 | 21 days 3 AA Batteries |
| 500 | 8 | 1.62 | 350 | 0.35 | 3 liters 3 AA Batteries |

Obviously, other embodiments and modifications of the present invention will occur readily to those of ordinary skill in the art in view of these teachings. Therefore, this invention is to be limited only by the following claims, which include all such obvious embodiments and modifications when viewed in conjunction with the above specifications and accompanying drawings.

I claim:

1. An electrochemical motor comprising:
storage means for holding a supply of electrochemically active gas;
a gas-tight pump housing;
a rigidly supported electrolytic membrane having two sides disposed in said gas-tight pump housing and defining therein first and second gas-tight pump chambers;
first connection means for the free flow of said gas from said storage means to said first gas-tight pump chamber;
a gas-tight motor housing comprising first and second motor partitions;
a diaphragm disposed in said gas-tight motor housing and defining therein a first gas-tight motor chamber with said first motor partition and a second gas-tight motor chamber with said second motor partition;
said two motor partitions disposed to act as immobile diaphragm stops;
at least one of said diaphragm stops being shaped to conform topographically with said diaphragm such that the displacement volume of at least one said motor chamber is substantially zero in at least one of said end of stroke positions of said diaphragm, so that said diaphragm may move from one said diaphragm stop to the other in substantially immediate response to a change in gas pressure in said first gas-tight motor chamber;
second connection means for providing a free flow of said gas between said second gas-tight pump chamber and said first gas-tight motor chamber;
at least one pervious electrode disposed on each said side of and in contact with said electrolytic membrane;
said at least one electrode on the first said side of said electrolytic membrane being separated from one another by spaces and said at least one electrode on the second side of said electrolytic membrane being disposed to form, wtih said at least one electrode on said first side, at least one electrode pair separated by said electrolytic membrane;
said gas being electrochemically reversibly active so as to enter into an anodic reaction at one side of said at least one electrode pair where the gas molecules are converted to ions transportable through said electrolytic membrane and a cathodic reaction at the opposite side of said at least one electrode pair where said ions are reconverted to gas molecules;
means for providing a reversible electric current to said at least one electrode pair, said current acting to transport said ions through said electrolytic membrane whereby said gas is pumped reversibly from one said side of said electrolytic membrane to the other;
pressure sensing means for sensing the pressure of said gas in at least one of said gas-tight pump chambers;
control means, responsive to said pressure sensing means for varying the magnitude and direction of said electric current to cause said gas to flow through said electrolytic membrane into one or the other of said gas-tight pump chambers; and
means for converting the gas pressure change in said second gas-tight motor chamber to mechanical motion.

2. An electrochemical motor comprising:
storage means for holding a supply of electrochemically active gas;
a gas-tight pump housing;
a rigidly supported electrolytic membrane having two sides disposed in said gas-tight pump housing and defining therein first and second gas-tight pump chambers;
first connection means for the free flow of said gas from said storage means to said first gas-tight pump chamber;
a gas-tight motor housing comprising first and second motor partitions;
a diaphragm disposed in said gas-tight motor housing and defining therein a first gas-tight motor chamber with said first motor partition and a second gas-tight motor chamber with said second motor partition;

said two motor partitions disposed to act as immobile diaphragm stops;

at least one of said diaphragm stops being shaped to conform topographically with said diaphragm such that the displacement volume of at least one said motor chamber is substantially zero in at least one of said end of stroke positions of said diaphragm, so that said diaphragm may move from one said diaphragm stop to the other in substantially immediate response to a change in gas pressure in said first gas-tight motor chamber;

second connection means for providing a free flow of said gas between said second gas-tight pump chamber and said first gas-tight motor chamber;

at least one pervious electrode disposed on each said side of and in contact with said electrolytic membrane;

said at least one electrode on the first said side of said electrolytic membrane being separated from one another by spaces and said at least one electrode on the second side of said electrolytic membrane being disposed to form, wtih said at least one electrode on said first side, at least one electrode pair separated by said electrolytic membrane;

said gas being electrochemically reversibly active so as to enter into an anodic reaction at one side of said at least one electrode pair where the gas molecules are converted to ions transportable through said electrolytic membrane and a cathodic reaction at the opposite side of said at least one electrode pair where said ions are reconverted to gas molecules;

means for providing a reversible electric current to said at least one electrode pair, said current acting to transport said ions through said electrolytic membrane whereby said gas is pumped reversibly from one said side of said electrolytic membrane to the other;

an integrated electrochemical pressure sensor comprising at least one additional pair of electrodes disposed on opposite sides of said electrolytic membrane in electrical isolation from said at least on pervious electrode pair;

control means, responsive to said integrated electrochemical pressure sensor for varying the magnitude and direction of said electric current to cause said gas to flow through said electrolytic membrane into one or the other of said gas-tight pump chambers; and means for converting the gas pressure change in said second gas-tight motor chamber to mechanical motion.

3. An electrochemical motor comprising:

storage means for holding a supply of electrochemically active gas;

a gas-tight pump housing;

a rigidly supported electrolytic membrane having two sides disposed in said gas-tight pump housing and defining therein first and second gas-tight pump chambers;

first connection means for the free flow of said gas from said storage means to said first gas-tight pump chamber;

a gas-tight motor housing comprising first and second motor partitions;

a diaphragm disposed in said gas-tight motor housing and defining therein a first gas-tight motor chamber with said first motor partition and a second gas-tight motor chamber with said second motor partition;

said two motor partitions disposed to act as immobile diaphragm stops;

at least one of said diaphragm stops being shaped to conform topographically with said diaphragm such that the displacement volume of at least one said motor chamber is substantially zero in at least one of said end of stroke positions of said diaphragm, so that said diaphragm may move from one said diaphragm stop to the other in substantially immediate response to a change in gas pressure in said first gas-tight motor chamber;

second connection means for providing a free flow of said gas between said second gas-tight pump chamber and said first gas-tight motor chamber;

at least one pervious electrode disposed on each said side of and in contact with said electrolytic membrane;

said at least one electrode on the first said side of said electrolytic membrane being separated from one another by spaces and said at least one electrode on the second side of said electrolytic membrane being disposed to form, wtih said at least one electrode on said first side, at least one electrode pair separated by said electrolytic membrane;

said gas being electrochemically reversibly active so as to enter into an anodic reaction at one side of said at least one electrode pair where the gas molecules are converted to ions transportable through said electrolytic membrane and a cathodic reaction at the opposite side of said at least one electrode pair where said ions are reconverted to gas molecules;

means for providing a reversible electric current to said at least one electrode pair, said current acting to transport said ions through said electrolytic membrane whereby said gas is pumped reversibly from one said side of said electrolytic membrane to the other;

pressure sensing means for sensing the pressure of said gas in at least one of said gas-tight pump chambers;

control means, responsive to said pressure sensing means for varying the magnitude and direction of said electric current to cause said gas to flow through said electrolytic membrane into one or the other of said gas-tight pump chambers;

at least one said motor partition further comprises an end of stroke sensor whereby an end of stroke signal is sent to said control means when said diaphragm reaches the end of stroke position and thereby contacts said motor partition, said control means being further responsive to said end of stroke signal; and means for converting the gas pressure change in said second gas-tight motor chamber to mechanical motion.

4. An electrochemical motor comprising:

storage means for holding a supply of electrochemically active gas;

a gas-tight pump housing;

a rigidly supported electrolytic membrane having two sides disposed in said gas-tight pump housing and defining therein first and second gas-tight pump chambers;

first connection means for the free flow of said gas from said storage means to said first gas-tight pump chamber;

a gas-tight motor housing comprising first and second motor partitions;

a diaphragm disposed in said gas-tight motor housing and defining therein a first gas-tight motor chamber with said first motor partition and a second gas-tight motor chamber with said second motor partition;

second connection means for providing a free flow of said gas between said second gas-tight pump chamber and said first gas-tight motor chamber;

at least one pervious electrode disposed on each said side of and in contact with said electrolytic membrane;

said at least one electrode on the first said side of said electrolytic membrane being separated from one another by spaces and said at least one electrode on the second side of said electrolytic membrane being disposed to form, with said at least one electrode on said first side, at least one electrode pair separated by said electrolytic membrane;

said gas being electrochemically reversibly active so as to enter into an anodic reaction at one side of said at least one electrode pair where the gas molecules are converted to ions transportable through said electrolytic membrane and a cathodic reaction at the opposite side of said at least one electrode pair where said ions are reconverted to gas molecules;

means for providing a reversible electric current to said at least one electrode pair, said current acting to transport said ions through said electrolytic membrane whereby said gas is pumped reversibly from one said side of said electrolytic membrane to the other;

an integrated electrochemical pressure sensor comprising at least one additional pair of electrodes disposed on opposite sides of said electrolytic membrane in electrical isolation from said at least one previous electrode pair;

control means, responsive to said integrated electrochemical pressure sensor for varying the magnitude and direction of said electric current to cause said gas to flow through said electrolytic membrane into one or the other of said gas-tight pump chambers; and means for converting the gas pressure change in said second gas-tight motor chamber to mechanical motion.

5. The electrochemical motor of any of claims 1, 2, 3 and 21 wherein said electrolytic membrane comprises at least one active section and at least one inactive section, wherein said inactive section has little or no diffusion capability and serves to control current density.

6. The electrochemical motor of any of claims 1, 2, 3 and 21 further comprising dumping means whereby the pressurized gas in said first gas-tight motor chamber is quickly moved back into said first gas-tight pump chamber in response to said control means.

7. The electrochemical motor of any of claims 1, 2, 3 and 21 further comprising means for recharging said storage means with an electrochemically active gas.

8. The electrochemical motor of claim 7 wherein said storage means is further charged with water for maintaining saturation of said electrolytic membrane.

* * * * *